April 1, 1952     D. C. GREEN     2,591,148
PRESSURE RESPONSIVE VALVE

Filed Aug. 8, 1947     2 SHEETS—SHEET 1

*INVENTOR.*
DONALD C. GREEN
BY
*Harry P. Canfield*
*ATTORNEY.*

April 1, 1952   D. C. GREEN   2,591,148
PRESSURE RESPONSIVE VALVE
Filed Aug. 8, 1947   2 SHEETS—SHEET 2

INVENTOR.
DONALD C. GREEN
BY *Harry P. Canfield*
ATTORNEY.

Patented Apr. 1, 1952

2,591,148

UNITED STATES PATENT OFFICE 2,591,148

PRESSURE RESPONSIVE VALVE

Donald C. Green, Russell, Ohio

Application August 8, 1947, Serial No. 767,393

5 Claims. (Cl. 251—119)

This invention relates to fluid flow controlling valves of the type that respond automatically to vary the size of the valve flow port in response to differences of pressure on the approach and discharge sides of the port, or in response to changes of flow rate through the port.

Perhaps the most important use of the invention is as a valve to damp out pulsations of fluid pressure communicated to a fluid pressure indicating gage; and the invention will therefore be described, particularly as applied to that use; although as will become apparent, the invention has broader scope than as a flow impulse dampener for gages, and is so claimed.

A pressure gage comprises generally speaking some kind of a walled chamber subjected interiorly to the variations of fluid pressure to be indicated by the gage; and a wall of the chamber moves responsive to changes of the pressure, and correspondingly moves an indicating finger or needle over a pressure-calibrated scale.

One of the most sensitive and accurate of such gages, is the so-called Bourdon tube gage, comprising a closed bent tube of thin sheet metal an end of which moves with changes of internal pressure and transmits its movement to a pivoted dial finger through a movement magnifying mechanism.

It is well known however that a sudden change of the pressure communicated to the tube, in the nature of a pressure surge or peak, will damage such gages, particularly the movement magnifying mechanism thereof; or at least will render the gage readings thereafter inaccurate.

Other types of gages, for example the type having a cylinder form of chamber with a pressure-movable piston therein, are usually more rugged, and less liable to actual damage; but in every type of gage, surges of pressure or rapid fluctuations of pressure are communicated to the indicating finger or needle and cause the needle to overtravel or vibrate so that the pressure cannot be read on the gage.

It has been proposed to overcome this objection to pressure gages by providing between the fluid pressure source and the gage a restricted orifice through which the fluid must flow to and from the gage pressure-chamber, as the source pressure rises and falls.

Such an orifice is of fixed size and the underlying idea is that flow through the orifice produces a drop of pressure thereat; and that when a surge of source pressure produces a corresponding increase of flow through the orifice, the gage is not subjected to the full surge pressure, but is subjected only to the difference between the surge pressure and the orifice pressure drop.

This expedient is not a satisfactory solution to the dampening problem because it has been found that if the orifice is made small enough to damp out high surge pressures, it will be so small as to excessively throttle the flow of fluid to the gage at ordinary non-surge changes of pressure, and delay its indication-response to these changes of pressure.

An ideal solution to the problem therefore would appear to be an orifice or flow restriction that would automatically change its size with changes of approach fluid pressure, being normally of ample size so as not to delay response of the gage to gradual changes of approach pressure, and becoming smaller and smaller upon the occurrence of greater and greater surges of approach pressure.

It is with this in mind that the present invention has been made, and accordingly it is an object of the invention to provide an impulse dampening orifice that decreases in size automatically when subjected to surges of approach pressure; and as a further object to provide such an orifice which decreases in size more and more for higher and higher surge pressure.

Other objects are:

To provide a device having an approach-pressure-operated automatically varying flow restriction, adapted to be built as a unitary accessory to be installed between a pressure gage and the approach pressure fluid conduit leading thereto and adapted to be alternatively built into a pressure gage construction or conduit line coupling, etc., as a part thereof.

To provide a device comprising a variable flow orifice operating, as referred to above, and operable to substantially cut off all flow at a preselected maximum surge pressure; or at steady pressure above a predetermined maximum.

To provide generally an improved impulse dampening device for fluid pressure gages.

While the invention as stated has perhaps its most important use as a surge dampening device for fluid pressure gages, the invention comprises an orifice or flow restriction which closes more and more as fluid pressure on one side of the orifice exceeds more and more that on the other side, it being this principle of the invention which adapts it to function as a dampener as aforesaid; and therefore besides being applicable to pressure gages as an impulse dampening device, the invention may be applied in other arts as a valve to control fluid flow in fluid conduits generally to prevent the flow rate from exceeding a predetermined rate when the approach pressure rises. In this use of the invention, a rise of approach pressure over the discharge pressure causes the restricting orifice or valve port to become smaller commensurably with the excess of approach pressure.

In this aspect, it is an object of the invention to provide a flow controlling valve automatically responsive to an excess of approach pressure over discharge pressure to commensurably reduce the size of the flow port or orifice of the valve; and, as a further object, to provide generally an improved automatic pressure responsive fluid flow controlling valve.

Other objects will be apparent to those skilled in the art to which the invention appertains.

The invention is fully disclosed in the following description taken in connection with the accompanying drawing, in which.

Figure 1:
Fig. 1 is an elevational view of a unitary embodiment of the invention drawn to full scale for uses wherein a flow passage of $\frac{1}{16}$ inch diameter is sufficient, as for example the flow to and from a Bourdon tube type of pressure gage.
Figure 2:
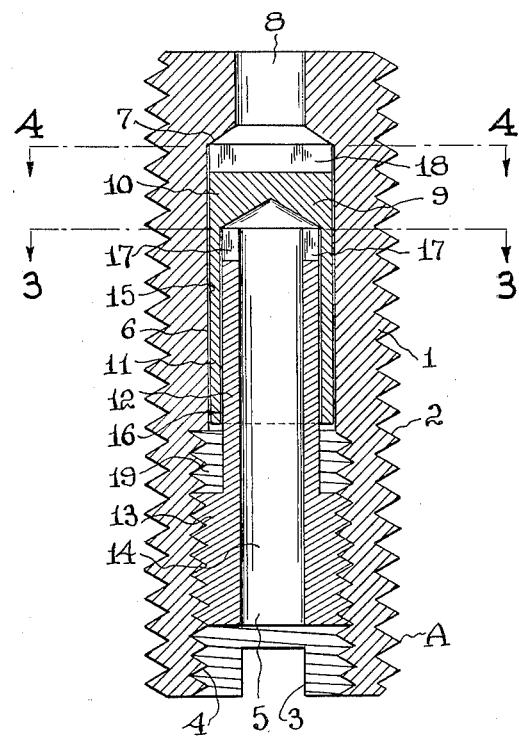
Fig. 2 is a longitudinal sectional view of the unitary embodiment of Fig. 1 drawn to greatly enlarged scale.
Figure 4:
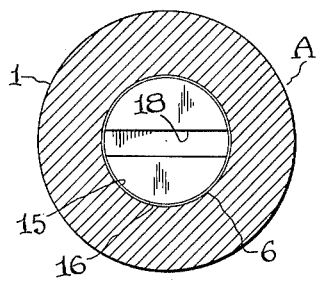
Figure 3:
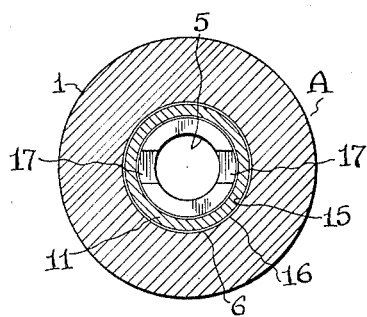
Figure 5:
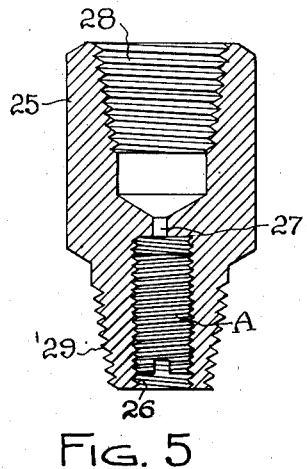
Figure 7:
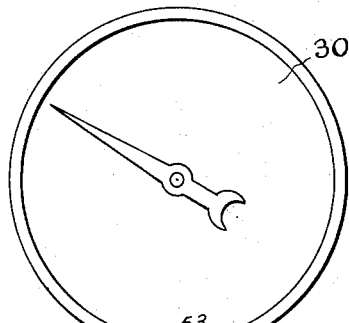
Figure 7:
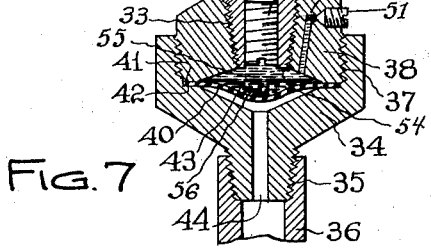
Figure 6:
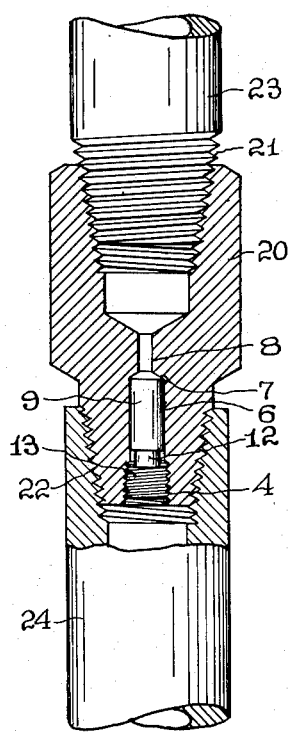
Figure 8:
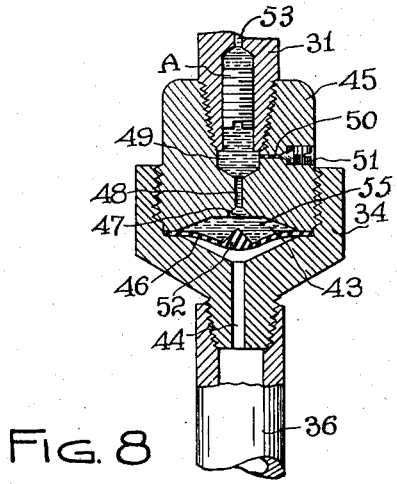

Figs. 3 and 4 are respectively cross sectional views taken from the planes 3—3 and 4—4 of Fig. 2;

Fig. 5 is a longitudinal sectional view of a male-female pipe-threaded coupler into which the unitary embodiment of Fig. 1 has been inserted;

Fig. 6 is a view similar to Fig. 5 but in a form in which the interior parts of Fig. 1 may be separately assembled;

Fig. 7 is a view showing a pressure gage into the stem of which the unitary embodiment of Fig. 1 has been inserted; and showing a diaphragm containing coupling for the stem;

Fig. 8 is a view similar to Fig. 7 illustrating a means for cutting off all flow to the gage when the approach fluid pressure attains an excessively high value.

Referring to the drawing Figs. 1 to 4, there is shown at A a unitary device comprising a housing having an exterior straight screw thread 2 thereon; preferably but not necessarily from end to end, whereby the housing may be screwed into a gage stem, or a conduit, or a coupling, or other part, the fluid flow through which is to be controlled. A slot 3 is provided at the lower end for turning it.

The housing 1 is generally tubular and open at both ends. Its lower end portion is internally threaded as a 4. Above the threads 4 is a cylindrical bore 6 the upper end of which terminates in a conical shoulder 7 and communicates with a fluid outlet 8.

Considered life size, as in Fig. 1, the outlet 8 may be $\frac{1}{16}$ inch diameter.

Telescoped into the bore 6 is an axially elongated cup 9 having a cup bottom 10 and a depending skirt 11.

Telescoped into the skirt 11 is a tube 12 having at its lower end a tube head 13 threaded into the threads 4; and thus sealedly connected to or becoming a re-entrant part of the housing, when the housing is considered as comprising the parts 1, 12, and 13.

The tube 12 and head 13 have a continuous internal bore 14 corresponding in diameter to the outlet 8, the lower end of the bore as at 5 constituting a fluid inlet.

The tube head 13 is screwed in until the upper end of the tube 12 engages the interior of the cup bottom 10 and pushes the cup 9 upwardly until the exterior of the cup bottom 10 engages the conical shoulder 7, and is then backed off by unscrewing it a small fraction of a turn so as not to bind the cup 9.

The tube 12 is longer than the cup skirt 11 and in the assembled position just described provides a space 19 between the head 13 and the end of the skirt 11. The upper end of the tube 12 has flow clearance with the cup bottom 10, and while the cup 9 may be supported in various ways to provide this clearance, I prefer to support it as described on the end of the tube, and to provide the flow clearance with the cup bottom by means of diametrically opposite notches or passages 17—17 in the end of the tube.

The outer end of the cup bottom 10 has a transverse groove or passage 18 therein.

The bore 6, skirt 11, and tube 12 are circular in cross section and their relative proportions are predetermined, and an illustrative example will be given later.

Clearance space is provided at 15 between the skirt 11 and the wall of the bore 6, and clearance space is provided at 16 between the skirt 11 and the tube 12; and the skirt 11 is a thin elastic or resilient wall, diametrically expansible and contractable and is preferably made of resilient metal; although rubber or like material may be utilized. Each of the clearance spaces 15 and 16 is of uniform radial thickness all around; and this is done by centering the tube 12 coaxial with the bore wall 6, and by centering the skirt 11 coaxial with both the tube 12 and the bore wall 6; the latter centering being done initially or approximately by making the said shoulder 7 conical as shown and coaxial with the bore wall 6 and engaging the cup bottom 10 with the conical shoulder 7; and thereafter, when binding of the cup 9 has been relieved as referred to, the skirt will be free to float and the flow of oil films through the spaces 16 and 15 (in a manner to be described) and tending to equalize themselves, will center the skirt coaxially and maintain the clearance spaces 15—16 of uniform radial thickness circumferentially.

In operation, as thus far described, the housing is mounted in the line of fluid flow so that fluid may enter with approach pressure at the inlet 5 and go out at the outlet 8.

The fluid, preferably oil as will be referred to again, flows upwardly through the tube bore 14 to the top of the tube and thence laterally through the passages 17—17 into the clearance space 16, downwardly therethrough into the said space 19, thence upwardly through the clearance space 15 and laterally into the passage 18, and thence out at the outlet 8.

The clearance spaces 15 and 16 are tubular in cross section and the fluid distributes substantially uniformly therein; and these clearance spaces taken together in series are of substantial axial length. A long tubular flow orifice 15—16 is thus provided by the clearance spaces, and tends to restrict the flow.

When the rate of flow is low, which occurs with ordinary changes of approach pressure, there will be negligible restriction to the flow and the fluid pressure will be substantially uniform throughout the whole length of this tubular flow passageway, or orifice.

When a surge of approach pressure at the inlet 5 occurs, tending to greatly increase the rate of flow, the restriction to flow in the tubular passageway 15—16 becomes greater and causes a considerable drop of pressure from end to end thereof; and causes the pressure in the clearance space 16 to exceed that in the clearance space 15. This exerts an expansive force on the thin tubular skirt 11 and it expands diametrically and reduces the clearance space 15 and throttles the flow and prevents the increased pressure from developing in the clearance space 15 and in the outlet 8.

The effective cross sectional area of the tubular passage 15—16 is thus reduced, and in proportion to, or at least commensurable with, the surge or peak of approach pressure. The rate of flow out at the outlet 8 is thus prevented from exceeding a predetermined maximum when surges occur.

Surges and fluctuations of approach pressure are thus damped out as and for the purposes described.

If instead of a sudden peak surge, the approach pressure should rise quickly to a new high value and persist at that value, the same action occurs and the rate of flow from the outlet 8 is kept down to the predetermined maximum.

Thus the over-all action of the device is that of a valve with a flow port or orifice 15—16 which reduces in size when the rate of flow through it exceeds a predetermined maximum; or when the approach pressure exceeds the outlet pressure by a predetemined excess.

An excessively high approach pressure will subject the interior of the skirt 11 to such great pressure as to expand it outwardly enough to entirely close the clearance space 15 and cut off all flow.

As an illustrative example of parts of the device of Figs. 1 and 2 for a flow inlet bore 14 and outlet 8 of $\frac{1}{16}$ inch diameter; the length of the clearance space 16 may be 0.2 inch and that of the clearance space 15 may be 0.266 inch; the radial thickness of the clearance spaces 15 and 16 may each be 0.001 inch; the cup 9 may be made of resilient brass and the length of the expansible cup skirt 12 may be 0.2 inch; and the wall thickness of the skirt 11 may be 0.0107 inch.

These above described radial dimensions can be readily arrived at by reaming the bore 6; reaming the cup skirt 11 internally and grinding it externally; and grinding the outer wall of the tube 12.

For a device A of these dimensions and proportions, it is obvious that the device will respond differently to the same pressure for flowing liquids of different viscosities and I have found that its full advantages are developed with a liquid having the viscosity of machine oil of 10W to 20W grade.

Figs. 5 and 6 illustrate alternative arrangements by which the valve device of Figs. 1 and 2 may be disposed in any conduit line of flow.

In Fig. 6, a coupling 20 is provided internally threaded at 4 and reamed out at 6 and having a shoulder 7 and an outlet 8 corresponding to the parts having these same numbers in Fig. 1; and the valve parts described for Fig. 1 are to be assembled therein. The coupling 20 thus takes the place of the housing 1 of Fig. 1.

Internal and external pipe threads 21—22 provide for connecting the coupling in the line of conduits 23—24.

In Figs. 5, a coupling 25 has a threaded bore 26 and the entire device A of Figs. 1 and 2 including the housing 1 is first assembled as a unit and then screwed into the threaded bore 26, the unit being designated at A. Above the unit A, a duct 27 communicates with a female pipe thread 28; and at the other end the coupling 25 has a male pipe thread 29 for connecting the coupling in a conduit line.

In Figs. 5 and 6, the couplings 25 and 20 and in Fig. 6 the conduits 23 and 24 are shown with thick walls, and the ducts 27 and 8 are shown relatively small; as indicating that the fluid in the controlled conduit line may be at high pressure and its flow velocity low, and that the control by the device A is independent of the absolute pressure in the conduit line.

In Fig. 7 is shown the unitary device A in association with a pressure gage 30 to damp out pressure surges and fluctuations. The conduit stem 31 of the gage, has the unitary device A screwed into a threaded bore 32 in the stem which communicates with the gage through a duct 53; and the stem 31 has a male pipe thread 33 thereon. The fluid pressure supply pipe or conduit (such as that shown at 36) can in practice be attached directly to the stem 31 by means of the threads 33 as will be understood; but I have used this figure to illustrate also an additional feature. A coupling 34 is provided having at one end male threads 35 for attaching the supply conduit 36 thereto; and at its other end has female straight threads 37, into which is screwed a clamp element 38 having internal pipe threads 39 into which the gage stem 31 is screwed.

A flexible diaphragm 40 is clamped between confronting annular shoulders 41—42 on the clamp element 38 and on the coupling 34; these parts being formed to provide a chamber 43 between the diaphragm 40 and the end of the gage stem 31. A duct 44 leads from the under side of the diaphragm 40 out through the coupling to the conduit 36.

By means of this construction, the pressure chamber of the gage 30 not shown; the duct 53; the bore 32 of the stem 31; the device A; and chamber 43 can all be filled with oil, glycerine, or other liquid 55 of desired viscosity, and all air excluded. The assembly is then a complete liquid-filled unit ready to be attached to the supply conduit 36. Pressure in the conduit 36 and duct 44 is communicated to the under side of the diaphragm 40 and moves it upwardly, supplying liquid 55 from the chamber through the unit device A, to the gage 30, under control of the device A as described.

With this arrangement, the liquid 55 above the diaphragm may be chosen to have a viscosity corresponding to a given set of parts of the flow controlling valve for optimum operating response thereof as referred to; and independent of the viscosity of the supply fluid below the diaphragm whose pressure is to be indicated; whereby a single construction of gage will indicate uniformly the pressure of liquids regardless of their viscosity, and will likewise indicate the pressure of gases.

In the foregoing, it was mentioned in connection with Fig. 2, that the cup skirt 11 would be expanded to engage the wall of the bore 6 and cut off all flow if the approach pressure became sufficiently in excess of the outlet pressure, as by a very great pressure surge or peak. In other words, the valve port or orifice in such instances becomes completely closed.

In Fig. 7, the diaphragm 40, when subjected to such great pressure will be moved upwardly far enough to engage and close the inner end of the stem 31, as at 54, to cut off further flow to the gage, as an alternative means to protect the gage.

In Fig. 8 is illustrated another alternating means for cutting off the flow, and having in some respects a different mode of operation.

The construction is generally the same as that of Fig. 7 having the corresponding conduit 31 (which may be the stem of a gage); the duct 53; a unit device A therein; a clamp element, here 45; the coupling 34; supply pipe 36; duct 44, chamber 43; and a diaphragm, here 46.

The clamp element 45, at a point above the center of the diaphragm 46, has a conical valve seat 47, and a duct 48 leading therefrom to a chamber 49 communicating with the open end of the conduit 31.

The diaphragm 46 may be molded from rubber or like flexible material, or may be pressformed from thin metal commonly used for diaphragms; and has at its center and on its upper side, a conical valve 52, normally spaced below and opposite the valve seat 47.

Pressure in the conduit 36 moves the diaphragm 46 and discharges liquid 55 from the chamber 43 through the conduit 31, under control of the unit A as described.

An excess of pressure in the supply conduit 36 will raise the diaphragm sufficiently far to engage the valve 52 with the valve seat 47 and close the duct 48.

When the constructions of Figs. 7 and 8, are used with pressure gages, it will be understood by those skilled in the art, that such pressure gages have some means acting in the nature of a spring, opposing the flow of fluid into the gage pressure chamber, and which will discharge the fluid out of the gage pressure chamber, and back into the supply conduit, or back into the diaphragm chamber 43 of Figs. 7 and 8, when the supply pressure falls. The diaphragms 40 and 46 of Figs. 7 and 8 will therefore, due to their flexibility, float back and forth with the inflow or outflow of the fluid.

In the form of Fig. 7 or Fig. 8, the diaphragm 40 or 46 will move upwardly and cut off the flow as described whenever the pressure in the supply conduit 36 reaches a predetermined maximum, even if it be a steady pressure. The unit device A may be relied upon to damp out surges and fluctuations of pressure, and may entirely cut off the flow if a peak surge of excessive value occurs; but in any event the diaphragm will cut off the flow at a maximum pressure.

This maximum pressure may be predetermined to be the maximum indicating pressure of the gage, to protect it against overtravel and injury as referred to; and is predetermined by the volumetric capacity of the chamber 43. As the diaphragm moves up and exhausts the liquid from the chamber 43, the liquid operates the gage, to indicate higher and higher pressures, and when the gage indicates maximum pressure, any further rise of pressure is cut off from the gage by the diaphragm, as described.

The amount of liquid 55 in the chamber 43 may be factory-adjusted for cut-off exactly at this maximum indication on the gage as aforesaid. To this end, a filling orifice 50 is provided, Figs. 7 and 8, communicating with the chamber 43, which, after the chamber 43 and the parts communicating therewith are filled with liquid as referred to, is closed and sealed by a plug 51. An excess of liquid is first supplied to the chamber 43. The approach pressure in the conduit 36 is then adjustably raised to a value at which the rising diaphragm cuts off. The gage will then indicate higher than said maximum value. The plug 51 is then loosened to bleed out some of the liquid, allowing the gage indication to settle back to the desired maximum, and then the plug is tightened.

As an alternative mode of operation, for the form of Fig. 7, the liquid in the chamber 43 may be of two kinds non-miscible and of different weights and viscosities, which when the device is mounted in the upright position illustrated, will separate, the heavier and more viscous liquid as shown at 56 being below the lighter and less viscous liquid 55. The lighter liquid 55 fills the device A and the gage pressure chamber etc. For a normal range of supply pressures to be indicated, the lighter liquid will operate the gage and be controlled by the device A as described, the upward movement of the diaphragm 40 being insufficient to discharge the heavier liquid 56 from the chamber 43 into the device A. Upon the occurrence of excess supply pressure (a peak pressure or steady pressure) the diaphragm 40 will be moved upwardly so far as to discharge the heavier liquid 55 into the device A, and because of its greater viscosity, it will actuate the device A more effectively in the described manner, and exert a magnified flow throttling action therein, or even cut off all flow, and protect the gage from the excess pressure. In this mode of operation, cut-off may be obtained with less than full stroke movement of the diaphragm.

The heavier more viscous liquid 56 may, adjustably, be caused to enter the device A and cut off, or substantially cut off, flow to the gage exactly at any desired maximum pressure indication on the gage. To this end, an excess of lighter liquid 55 is supplied to chamber 43 at the filling orifice 50. The pressure in the conduit 36 is adjustably raised until the more viscous liquid 56 enters the device A. Because of its more effective actuation of the device A, as described, the rising pressure being indicated on the gage will stop rising, or its rise will abruptly slow down, as the pressure in the conduit 36 continues to rise. This indicated pressure on the gage will be higher than the desired maximum. The approach pressure in the conduit 36 is then cut off, and some of the lighter liquid is bled out at the plug 51 as described. This aforesaid adjusting operation is repeated; and for less and less lighter liquid 55 the heavier liquid 56 enters the device A earlier and earlier and shows its presence by the stopping or slowing down of the indication on the gage as referred to; and when the action of the gage shows that the heavier liquid 56 has entered and actuated the device A at the desired maximum pressure, the adjustment is complete.

In the foregoing, and as preferred, the inlet of liquid at 5 and outlet at 6 causes the cup skirt 11 to expand or increase in diameter upon occurrence of excess flow rate or inlet pressure. The same parts will operate satisfactorily to the same ends, if the direction of flow is reversed, and the skirt 11 is compressed or caused to contract in diameter under the same conditions; and my invention comprehends both modes of operation.

For the two liquids above referred to, I have found, as illustrative of such liquids, that a light or medium mineral oil for the lighter liquid 55, and glycerine for the heavier more viscous liquid 56, will perform satisfactorily as described.

Besides the foregoing forms and modifications embodying the invention, other changes and modifications may be made as will occur to those skilled in the art, and the invention is comprehensive of all of the same which come within the scope of the appended claims.

I claim:

1. A fluid flow controlling valve structure comprising: a housing having an elongated generally cylindrical passageway therein, open at one end to provide a fluid outlet; a tube extending longitudinally within the tubular passageway and having a free portion at one end and open at that end; and joined at the other end to the passageway wall; the tube interior opening through said joined end and providing a fluid inlet; a tubular element having a tubular resilient wall closed at one end; the resilient wall telescoped within the said passageway and having restricted wall clearance therewith, and being telescoped over the free end portion of said tube and having restricted wall clearance therewith; the closed end of the tubular element having flow clearance with the said open end of the tube therewithin; and stop means preventing endwise displacement of the tubular element from its said telescoped position.

2. A fluid flow controlling valve structure comprising an elongated generally tubular walled housing open at both ends to provide an inlet and an outlet, an intermediate portion of the housing interior wall being generally cylindrical; a tube open at both ends and connected at one end to the interior wall of the tubular housing, and free at the other end, and projecting at the free end into the cylindrical wall portion; a cup form element having a resilient skirt telescoped within said cylindrical wall portion and telescoped over the said tube free end, and the cup bottom being supported in flow clearance relation upon the free end of the tube; stop means preventing axial displacement of the cup form element from telescoped relation with the tube free end; the cup skirt having predetermined restricted flow clearances with the said cylindrical wall portion and tube respectively whereby a restricted flow passageway is provided between the inlet and outlet, through the tube and between the skirt and the tube and between the skirt and cylindrical wall portion; the skirt being yieldable to change its diameter upon the occurrence of a difference of pressure inside and outside the skirt, caused by a predetermined difference between inlet and outlet pressure, and upon yielding, further restricting the flow passageway.

3. A unitary fluid flow controlling valve device comprising a generally tubular housing externally threaded for sealedly screwing it into a conduit line of flow; the housing being open at both ends to provide flow inlet and outlet orifices; and having internally a cylindrical wall portion; a tube in the housing sealedly communicating with one orifice and parallel with the cylindrical housing wall portion; a cup-form element having a cup bottom and a skirt disposed in the housing with the skirt in telescoped relation around the tube and within the cylindrical wall portion and in clearance relation with both, and the cup bottom in clearance relation with the free end of the tube; stop means preventing axial displacement of the cup skirt from said telescoped relation; whereby when the inside and outside of the cup skirt are subjected to a predetermined difference of pressure corresponding to different inlet and outlet pressures; the skirt yields diametrically.

4. A fluid flow controlling valve structure comprising a fluid conducting conduit having an inlet and an outlet, and a flow-restricting flow-passageway therebetween in which a drop of pressure is produced by flow therethrough; a wall portion of the passageway being tubular and of resilient material and disposed to be subjected on its opposite sides to fluid inlet and fluid outlet pressures; and being resiliently yieldable upon occurrence of a predetermined difference of said pressures and the resilient wall portion disposed to further restrict the flow passageway upon yielding; a walled chamber having a transverse flexible diaphragm wall; the chamber at one side of the diaphragm sealedly communicating with the inlet; a first liquid partly filling the chamber and a second liquid filling the rest of the chamber and the flow passageway; the liquids being of two non-miscible kinds, the first heavier and more viscous than the second, and the lighter and heavier liquids dischargeable successively through the passageway upon bending of the diaphragm.

5. A fluid flow controlling valve structure comprising a housing having a fluid flow inlet and a fluid flow outlet and between them having a walled flow passageway an intermediate portion of the wall of which is generally cylindrical; a tubular wall of resilient material, and means supporting it in the cylindrical wall portion; the tubular wall having restricted clearance with the cylindrical wall portion; flow directing means directing fluid flowing from the inlet to the outlet to go into the interior of the tubular wall and through the restricted clearance in series; to thereby subject the tubular wall to the pressure difference caused by drop of pressure in the restricted clearance; the tubular wall being resiliently yieldable diametrically to change the restricted clearance upon occurrence of changes of the said pressure difference.

DONALD C. GREEN.

REFERENCES CITED

The following references are of record in the file of this patent:

UNITED STATES PATENTS

| Number | Name | Date |
|---|---|---|
| 28,058 | Boyle | May 1, 1860 |
| 39,820 | Lunkenheimer | Sept. 8, 1863 |
| 2,037,425 | Martin | Apr. 14, 1936 |
| 2,210,480 | Brice | Aug. 6, 1940 |
| 2,216,374 | Martin | Oct. 1, 1940 |

FOREIGN PATENTS

| Number | Country | Date |
|---|---|---|
| 190,814 | Great Britain | 1923 |